(12) United States Patent
Nakamura et al.

(10) Patent No.: US 11,869,541 B1
(45) Date of Patent: Jan. 9, 2024

(54) LOAD/UNLOAD RAMP FOR HIGH-CAPACITY HARD DISK DRIVE

(71) Applicant: Western Digital Technologies, Inc., San Jose, CA (US)

(72) Inventors: Taichi Nakamura, Sagamihara (JP); Biao Sun, Fremont, CA (US); Katsuhide Tanaka, Hiratsuka (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/864,259

(22) Filed: Jul. 13, 2022

(51) Int. Cl.
*G11B 25/04* (2006.01)
*G11B 21/12* (2006.01)
*G11B 21/22* (2006.01)

(52) U.S. Cl.
CPC ............ *G11B 25/043* (2013.01); *G11B 21/12* (2013.01); *G11B 21/22* (2013.01)

(58) Field of Classification Search
None
See application file for complete search history.

(56) References Cited

U.S. PATENT DOCUMENTS

| | | | |
|---|---|---|---|
| 5,189,575 A * | 2/1993 | Onooka | G11B 21/12 |
| 5,633,767 A * | 5/1997 | Boutaghou | G11B 20/1816 |
| 5,831,786 A | 11/1998 | Boutaghou et al. | |
| 6,134,076 A | 10/2000 | Boutaghou et al. | |
| 6,157,520 A * | 12/2000 | Mangold | G11B 21/22 |
| 6,163,440 A * | 12/2000 | Takahashi | G11B 21/22 |
| 6,344,950 B1 * | 2/2002 | Watson | G11B 21/22 |
| 8,035,913 B2 | 10/2011 | Kim et al. | |
| 9,171,560 B1 | 10/2015 | Davidson et al. | |
| 9,218,833 B1 | 12/2015 | Shah et al. | |
| 10,910,005 B1 * | 2/2021 | Teo | G11B 5/4826 |
| 2001/0015875 A1 * | 8/2001 | Ohta | G11B 5/54 |
| 2002/0060883 A1 | 5/2002 | Suzuki | |
| 2005/0174696 A1 | 8/2005 | Choi et al. | |

(Continued)

FOREIGN PATENT DOCUMENTS

DE 602005001561 T2 10/2007

OTHER PUBLICATIONS

Suk, M., et al., Load/Unload Systems With Multiple Flying Height States (Abstract), Journal of Tribology, Apr. 19, 2004, 7 pages, J. Tribol. Apr. 2004, 126(2): 367-371, American Society of Mechanical Engineers, downloaded at https://asmedigitalcollection.asme.org/tribology/article-abstract/126/2/367/464723/Load-Unload-Systems-With-Multiple-Flying-Height.

*Primary Examiner* — Peter Vincent Agustin
(74) *Attorney, Agent, or Firm* — John D. Henkhaus

(57) ABSTRACT

A multi-slope load/unload ramp for a hard disk drive includes an inner first portion having a non-horizontal first slope and an adjacent outer second portion having a different non-horizontal second slope. The first slope may be steeper than the second slope, and the ramp may further include a third portion adjacent to the second portion and also having a third slope steeper than the second slope, with the ramp configured for positioning the first and second portions to overlap the disk while the third segment may be in part outside the disk. The second slope may be steeper than the first slope, with the ramp configured for positioning the first portion to overlap the disk while the second portion may be in part outside of the disk. Hence, any slider rebound from the steeper portions would occur outside of the disk and avoid a slider-disk crash.

17 Claims, 3 Drawing Sheets

(56) References Cited

U.S. PATENT DOCUMENTS

| | | | | |
|---|---|---|---|---|
| 2005/0270699 | A1* | 12/2005 | Takahashi | G11B 5/54 |
| 2007/0206331 | A1* | 9/2007 | Deguchi | G11B 5/54 |
| 2010/0067138 | A1* | 3/2010 | Ooi | G11B 5/54 360/71 |
| 2010/0246053 | A1* | 9/2010 | Satou | G11B 21/22 360/75 |
| 2021/0295871 | A1* | 9/2021 | Ma | G11B 21/22 |

\* cited by examiner

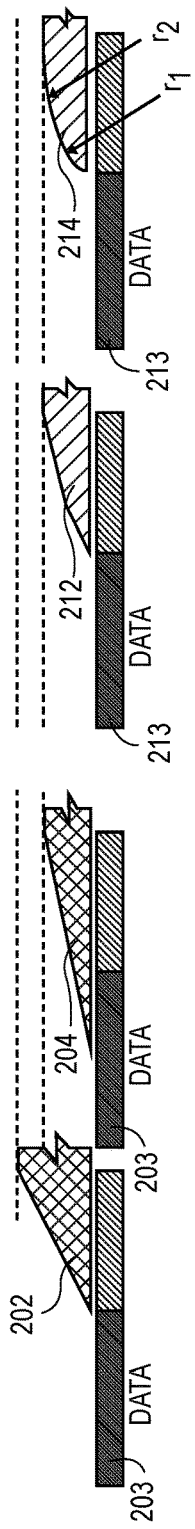
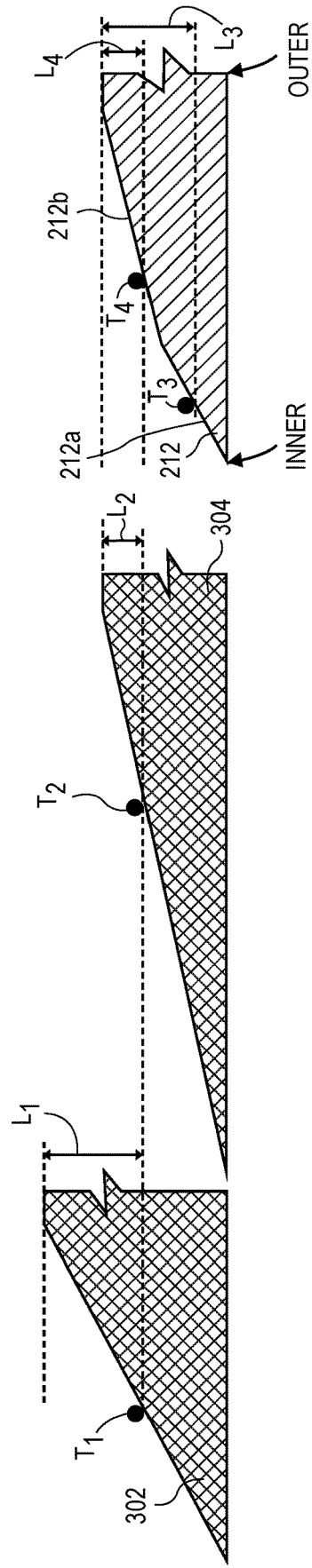

LOAD/UNLOAD RAMP FOR HIGH-CAPACITY HARD DISK DRIVE

FIELD OF EMBODIMENTS

Embodiments of the invention may relate generally to data storage devices such as hard disk drives and particularly to approaches to a load/unload ramp suitable for high-capacity drives.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Ramp load/unload (LUL) technology involves a mechanism that moves the head stack assembly (HSA), including the read-write head sliders, away from and off the disks and safely positions them onto a cam-like structure. The cam typically includes for each slider a shallow ramp on the side closest to the disk, which merges with a typically horizontal "parking" area that may have a detent feature to hold the corresponding slider in place. During a power-on sequence, for example, the read-write heads are loaded by moving the sliders off the ramp and over the disk surfaces when the disks reach the appropriate rotational speed. Thus, the terminology used is that the sliders or HSA are "loaded" to or over the disk (i.e., off the ramp) into an operational position, and "unloaded" from the disk (i.e., onto the ramp) such as in an idle position. A ramp configuration can affect the amount that the head sliders are lifted as well as the speed at which they are loaded and unloaded.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 2A is a diagram illustrating ramp slope angle attributes of a single-angle sloped HDD load/unload ramp;

FIG. 2B is a diagram illustrating a two-angle sloped HDD load/unload ramp, according to an embodiment;

FIG. 2C is a diagram illustrating a curve sloped HDD load/unload ramp, according to an embodiment;

FIG. 3A is a diagram illustrating ramp lift height attributes of a single-angle sloped HDD load/unload ramp;

FIG. 3B is a diagram illustrating a two-angle sloped HDD load/unload ramp, according to an embodiment;

DETAILED DESCRIPTION

Figure 1:
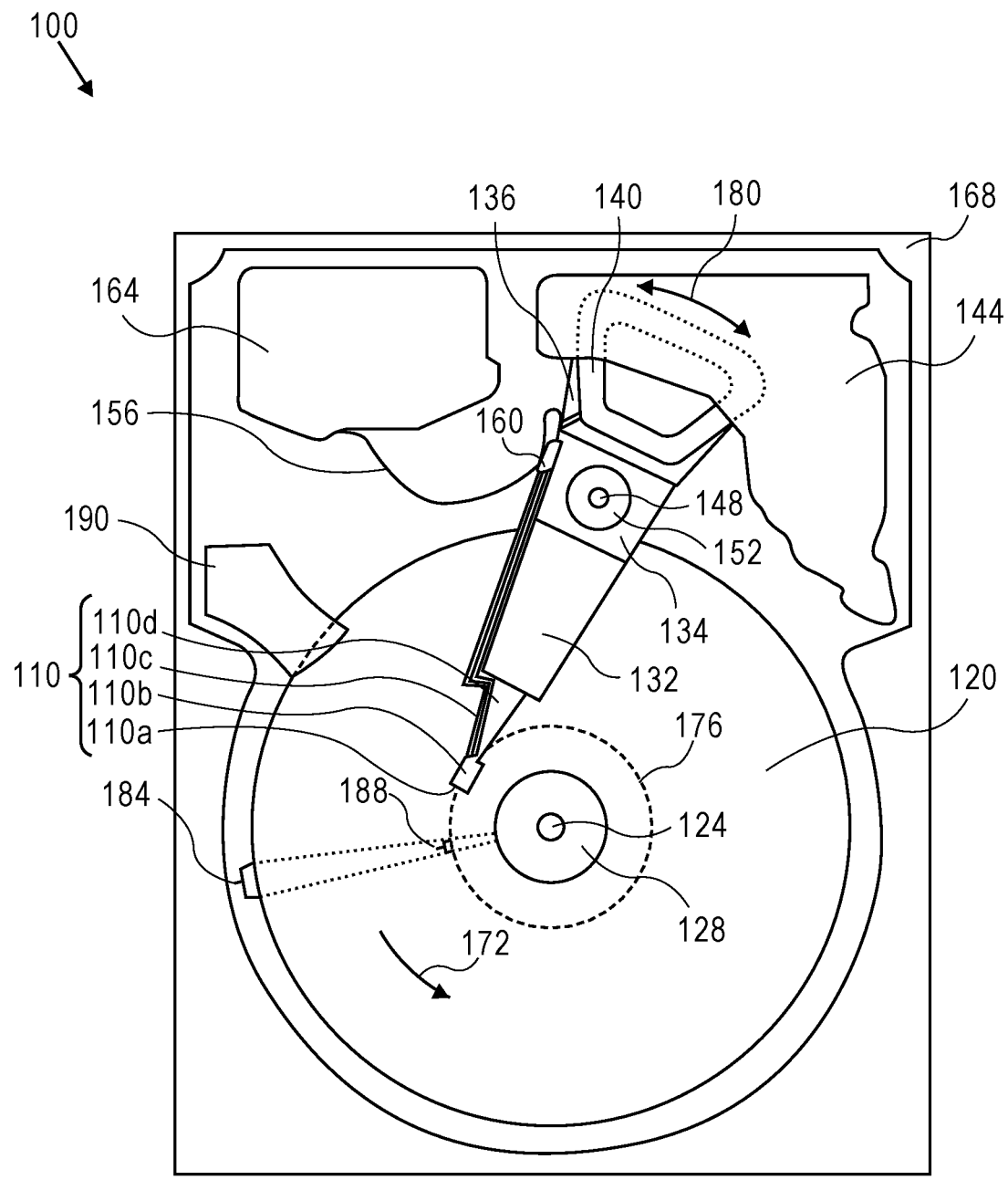
FIG. 1 is a plan view illustrating a hard disk drive (HDD), according to an embodiment.

Generally, approaches to a load/unload ramp suitable for high-capacity hard disk drives are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

CONTEXT

Increasing the storage capacity of hard disk drives (HDDs) is one of the on-going goals of HDD technology evolution. In one form, this goal manifests in increasing the number of disks implemented in a given HDD. However, oftentimes maintaining a standard form factor is required, as characterized in part by the z-height (vertical height) of an HDD, which inherently provides challenges with respect to fitting more disks into a given HDD.

Recall that ramp load/unload (LUL) technology involves a mechanism that moves the head sliders away from and off the disks and safely positions them onto a cam-like structure, where the shallow ramp portion of the ramp part on the side closest to the disk may be referred to as the "ramp", "ramp slope", "ascending portion", and the like. The physical configuration of a ramp can affect the amount that the sliders are lifted as well as the speed at which they are loaded and unloaded. At unloading, the slider moves up and away from the disk first, and then typically moves back down toward the disk, a phenomenon referred to herein as slider "rebound". More particularly, the slider is lifted gradually by way of a lift tab extending from the end of the suspension load beam mechanically interacting with and thereby being lifted on the ramp slope, while the gramload on the slider is decreasing gradually. Here, the term "gramload" generally refers to the spring load of the entire suspension and slider assembly. However, the slider air bearing surface (ABS) forces include not only a positive lift force for flying over the disk but also a negative suction force. Therefore, even while the gramload is decreasing the slider is still being pulled close to the disk for some duration (due to the suction) until the ABS breaks from or overcomes the suction force. Once enough lifting is achieved to overcome the ABS forces, the slider typically moves upward rapidly. Because the suspension (including the flexure) acts as a spring, once the slider moves high it then returns to low (i.e., closer to the disk), and then continues the high-low loop (e.g., slider oscillation) with damping, until the slider oscillation finally ends. Note that the first rebound or return motion is the highest slider-disk contact risk point in the unloading process. As a ramp shape parameter, sufficient ramp slope height is important for the head unloading process without head-disk contact. However, maintaining current ramp slope height becomes a gating factor for achieving higher capacity HDDs, as the height constraint affects the ability to put many disks into one HDD.

Furthermore, in a normal unloading process, the unload speed is controlled appropriately by voice coil motor (VCM) power control. Thus, a constant unloading speed is applied when unload command is executed, regardless of the radial location of the read-write head. On the other hand, in an emergency power off (EPO) situation in which the power supply is suddenly stopped while the head is flying over the disk, immediate unload is needed before the disk rotation is stopped and the head crashes onto the disk. Thus, the VCM cannot be controlled appropriately due to the power loss and capacitance-stored power is used for the head unloading. However, such stored power is constant so, regardless of head radial location, the same amount of power is applied for the unloading. This results in a large variation in the unloading speed at ramp touching (e.g., the moment the HSA makes contact with the ramp) and, to ensure the head escapes from the disk, a relatively high velocity is applied. Hence, EPO is the highest-speed unloading situation and is therefore a high-risk condition that requires consideration.

Typically, in the context of ramp slope angle, a gentler or smaller slope/angle is better for achieving a ramp height reduction, at least in part because the vertical lift speed correlates to the rebound amount. Stated otherwise, the gentler the ramp slope the slower the vertical lift speed and, consequently, less rebound distance likely occurs. FIG. 2A is a diagram illustrating ramp slope angle attributes of a single-angle sloped HDD load/unload ramp. HDD load/unload (LUL) ramps are typically interleaved with the recording-disk stack. Thus, the storage area of the recording-disk at which the ramp overlaps cannot be used to write data because the read-write head simply cannot fly over that portion of the disk due to the presence of the ramp. While modeling and experimental data indicate that a gentler slope (i.e., smaller angle) is a better approach to reducing the ramp slope height, a goal associated with expanding the disk count, such a gentler slope decreases the disk data area due to larger ramp-disk overlap area. Such lost data area may indeed cancel the capacity gained by employing more disks in an HDD. Hence, with a single-angle sloped LUL ramp such as LUL ramp 202 and LUL ramp 204, the slope of the ramp affects the amount of disk area that is available for data storage. For example and as illustrated in FIG. 2A, the steeper ramp 202 overlaps with less of the disk 203 than the more moderate or gentler or shallower-sloped ramp 204 and, therefore, less disk storage area is lost with the steeper ramp 202 due to the overlap area. However, a general goal here is to reduce the ramp height between the disks so that more disks can be employed and positioned closer together, and maintaining existing ramp height does not achieve that goal. In view of the foregoing, it remains a challenge to reduce ramp slope height without consequent loss of disk data area.

Typically, in the context of ramp slope height, higher is better because the peak slider flying height (e.g., the distance the slider flies above the disk) correlates to ramp slope height. However, with recognition that the ramp slope height (e.g., the height of the ramp slope area, or simply "ramp height") affects the ability to put additional disks into the same HDD z-height form factor, the ramp height manifests as a gating factor for achieving higher capacity HDDs. FIG. 3A is a diagram illustrating ramp lift height attributes of a single-angle sloped HDD load/unload ramp. Again, while a gentler slope (i.e., smaller angle) is generally a better approach to ramp height reduction, such a gentler slope tends to decrease the desired or required lift height, thereby affecting the peak slider flying height. Hence, with a single-angle sloped LUL ramp such as LUL ramp 302 and LUL ramp 304, the slope of the ramp affects the ultimate lift height. For example and as depicted in FIG. 3A, the steeper ramp 302 generates a lift height $L_1$ (e.g., the vertical distance between ramp touch point $T_1$, where the suspension lift tab first touches or contacts the ramp, and top of ramp 302) while the more moderate or gentler or shallower-sloped ramp 304 generates a smaller lift height $L_2$ (e.g., the vertical distance between ramp touch point $T_2$, where the suspension lift tab first touches or contacts the ramp, and top of ramp 304). Therefore, peak flying height is compromised with a less steep ramp 304. Thus, it remains a challenge to reduce ramp slope height without consequent loss of lift height. In view of the foregoing, the height and slope of a LUL ramp(s) affects how many disks can fit into a standard form factor HDD while maintaining maximum disk data storage area and desirable peak slider flying height.

Hard Disk Drive Multi-Slope Load/Unload Ramp

FIG. 2B is a diagram illustrating a two-angle sloped HDD load/unload ramp, according to an embodiment. Multi-slope ramp 212 illustrates a ramp slope portion having multiple slope angles, i.e., two different slope angles in this example. Comparing the peak ramp slope height of multi-slope ramp 212 with ramp 204 of FIG. 2A, one can appreciate that the ramp slope height of multi-slope ramp 212 is roughly equivalent to the ramp slope height of single-slope ramp 204, while multi-slope ramp 212 overlaps with less of disk 213 than the single-slope ramp 204 overlaps with disk 203. Hence, an equivalent ramp height reduction can be achieved with multi-slope ramp 212 without a consequent additional loss of disk data area. Note that while a two-angle ramp example is illustrated in FIG. 2B in the context of multi-slope ramp 212, the number of slope angles for a multi-slope ramp may vary from implementation to implementation and thus may be greater than the two angles exemplified here (see, e.g., FIG. 4B).

FIG. 2C is a diagram illustrating a curve sloped HDD load/unload ramp, according to an embodiment. Multi-slope ramp 214 illustrates a ramp slope portion having multiple slope angles, in this case intended to include multiple slope arcs or radii of curvature, e.g., first radius of curvature $r_1$ and second radius of curvature $r_2$. Here again, comparing the peak ramp slope height of multi-slope ramp 214 with ramp 204 of FIG. 2A, one can appreciate that the ramp slope height of multi-slope ramp 214 is roughly equivalent to the ramp slope height of single-slope ramp 204, while multi-slope ramp 214 overlaps with less of disk 213 than the single-slope ramp 204 overlaps with disk 203. Hence, an equivalent ramp height reduction can be achieved with multi-slope ramp 214 without a consequent additional loss of disk data area. Similarly as with multi-slope ramp 212, the number of radii of curvature for a multi-slope/multi-curve ramp such as multi-slope ramp 214 may vary from implementation to implementation. Note that the embodiment of a multi-slope ramp depicted as multi-slope ramp 212 and the embodiment of a multi-slope ramp depicted as multi-slope/multi-curve ramp 214 may be combined into a ramp implementation, such as by combining an initial one or more linear slope with an adjacent one or more curved slope ascending in the direction up the ramp slope, or vice versa.

FIG. 3B is a diagram illustrating a two-angle sloped HDD load/unload ramp, according to an embodiment. As such, FIG. 3B again depicts multi-slope ramp 212 as a ramp slope portion having multiple slope angles, i.e., two different slope angles in this example, from an inner end which would be positioned proximal to the disk stack and an outer end positioned distal from the disk stack. A first portion 212a of multi-slope ramp 212 has a non-horizontal first slope and a second portion 212b of multi-slope ramp 212 adjacent to the first portion 212a has a different non-horizontal second slope adjacent to a horizontal parking surface. Note that the first and second portions 212a, 212b are not necessarily drawn to scale, but are presented for descriptive purposes. In an instance in which the touch point $T_3$ (e.g., where the suspension lift tab first touches or contacts the ramp) is lower, e.g., at the first portion 212a, a steeper (larger or higher angle) portion 212a is suitable because the ultimate lift height $L_3$ (e.g., the vertical distance between ramp touch point $T_3$ and top of ramp 212) needed is relatively large. Furthermore, in an instance in which the touch point $T_4$ is higher up on the ramp 212, e.g., at the second portion 212b, a gentler (smaller or lower angle) portion 212b is suitable because the lift height $L_4$ (e.g., the vertical distance between ramp touch point $T_4$ and top of ramp 212) needed is relatively small.

With respect to the respective effective slope angles of the first portion 212a and the second portion 212b, a comparison is made between the best fit line of the portion of multi-slope ramp 212 that is between 20%-50% (the "bottom 30%") of the vertical height (or "z-height") of the ramp 212 and the best fit line of the portion of multi-slope ramp 212 between 65%-95% (the "top 30%") of the vertical height of the ramp 212. With a multi-slope ramp such as ramp 212, the bottom 30% range falls within the first portion 212a and the top 30% range falls within the second portion 212b. To focus on the effective slopes, the bottom 20% of the vertical height is treated as a functional exception and dismissed for this comparison, and the top 5% is also dismissed as there is typically some small radius at the transition from sloped surface to horizontal parking surface due to manufacturing process control. Thus, for a conventional single-angle sloped ramp such as ramp 202, 204 of FIG. 2A, the ratio of the top 30% angle (numerator) over the bottom 30% angle (denominator) equals 1.00. By contrast, for a non-limiting example found suitable for the purposes described herein, for a two-slope ramp such as ramp 212 (FIGS. 2B, 3B), the ratio of the top 30% angle over the bottom 30% angle may be equal or close to 0.73. Similarly, for a non-limiting example found suitable for the purposes described herein, for a multi-slope/multi-curve ramp such as ramp 214 (FIG. 2C), the ratio of the top 30% angle over the bottom 30% angle may be equal or close to 0.85. Hence, according to an embodiment the ratio of the top 30% angle (numerator) over the bottom 30% angle (denominator) of a suitable 2-slope/2-curve multi-slope ramp is less than 0.90.

Figure 4A:
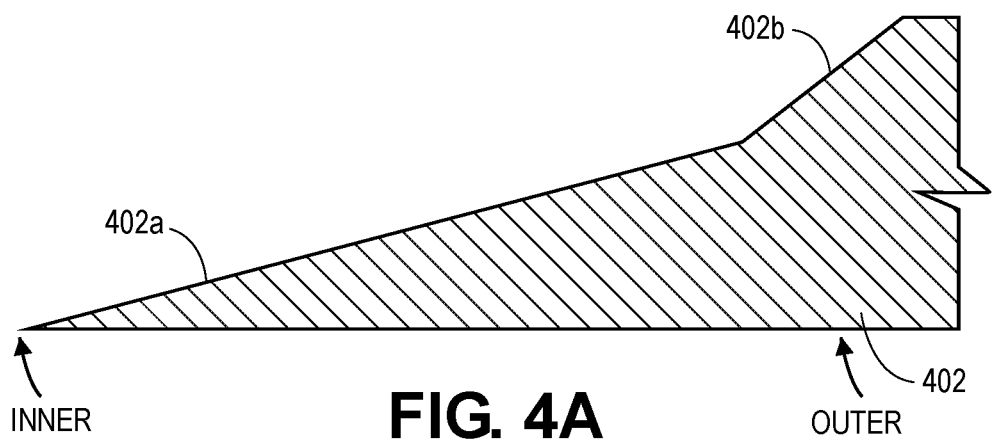
FIG. 4A is a diagram illustrating a two-angle sloped HDD load/unload ramp for rebound management, according to an embodiment.

FIG. 4A is a diagram illustrating a two-angle sloped HDD load/unload ramp for rebound management, according to an embodiment. Multi-slope ramp 402 illustrates a ramp slope portion having multiple slope angles, i.e., two different slope angles in this example from an inner end which would be positioned proximal to the disk stack and an outer end positioned distal from the disk stack. A first portion 402a of multi-slope ramp 402 has a non-horizontal first slope and a second portion 402b of multi-slope ramp 402 adjacent to the first portion 402a has a different non-horizontal second slope adjacent to a horizontal parking surface. Note that the first and second portions 402a, 402b are not necessarily drawn to scale, but are presented for descriptive purposes. As depicted and according to an embodiment, the second slope is steeper than the first slope, such that the second portion 402b has a steeper or larger angle than the angle of the first portion 402a. According to a related embodiment, as installed in a data storage device such as an HDD, the first portion 402a is configured for positioning to overlap with the disk media of the HDD while the second portion 402b is configured for positioning to be at least in part outside of the disk media in the distal (outer) direction. Hence, multi-slope ramp 402 provides for minimal slider lift until near the disk edge, where then the slider lift increases rather sharply or acutely. Consequently the rebound from the steeper portion 402b occurs outside of the disk position and, therefore, avoids a slider-disk crash.

Figure 4B:
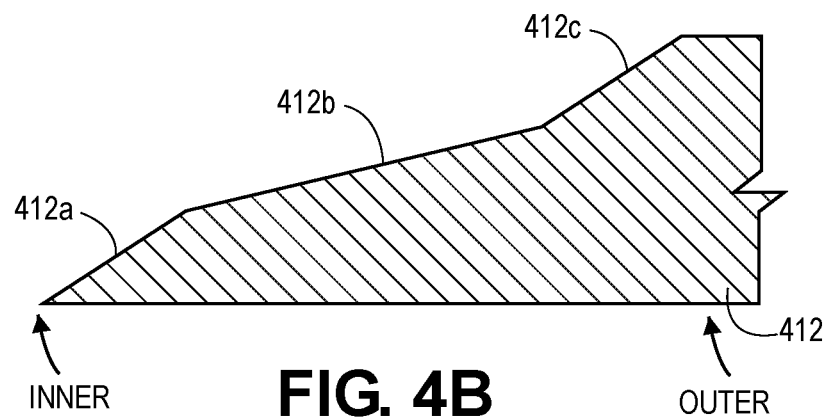
FIG. 4B is a diagram illustrating a three-angle sloped HDD load/unload ramp for rebound management, according to an embodiment.

FIG. 4B is a diagram illustrating a three-angle sloped HDD load/unload ramp for rebound management, according to an embodiment. Multi-slope ramp 412 illustrates a ramp slope portion having multiple slope angles, i.e., three different slope angles in this example from an inner end which would be positioned proximal to the disk stack and an outer end positioned distal from the disk stack. A first portion 412a of multi-slope ramp 412 has a non-horizontal first slope, a second portion 412b of multi-slope ramp 412 adjacent to the first portion 412a has a different non-horizontal second slope, and a third portion 412c adjacent to the second portion has a non-horizontal third slope adjacent to a horizontal parking surface and different from the second slope. Note that the first, second, and third portions 412a, 412b, 412c are not necessarily drawn to scale, but are presented for descriptive purposes. As depicted and according to an embodiment, the third slope is steeper than the second slope, such that the third portion 412c has a steeper or larger angle than the angle of the second portion 412b. According to a related embodiment, as installed in a data storage device such as an HDD, the first portion 412a and the second portion 412b are configured for positioning to overlap with the disk media of the HDD while the third portion 412c is configured for positioning to be at least in part outside of the disk media in the distal direction. Hence, multi-slope ramp 412 provides for minimal to moderate slider lift until near the disk edge, where then the slider lift increases rather sharply or acutely. Consequently the rebound from the steepest third portion 412c occurs outside of the disk position and, therefore, avoids a slider-disk crash. Additionally, when comparing multi-slope ramp 402 (FIG. 4A) with multi-slope ramp 412 (FIG. 4B), multi-slope ramp 412 would also overlap with less of the disk area than would multi-slope ramp 402.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations. The HSA is configured to mechanically interact with a load/unload (LUL) ramp 190 to move the head stack assembly (HSA), including the read-write head sliders, away from and off the disks and to safely position them onto the supporting structure of the LUL ramp.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
a disk media stack comprising a plurality of disk media rotatably mounted on a spindle;
a head stack assembly (HSA) comprising a plurality of head sliders each comprising a read/write head configured to read from and to write to at least one disk media of the disk media stack;
a voice coil motor configured to move the HSA for the plurality of head sliders to access portions of a corresponding disk media of the disk media stack; and
a load/unload ramp having an inner end positioned proximal to the disk media stack and an outer end positioned distal from the disk media stack, the load/unload ramp configured for loading the HSA to the disk media stack and for unloading the HSA from the disk media stack, the load/unload ramp comprising, in a direction from the inner end to the outer end:
a first portion having a non-horizontal first slope; and
a second portion adjacent to the first portion and having a different non-horizontal second slope;
wherein the first slope is steeper than the second slope.

2. The data storage device of claim 1, wherein:
the load/unload ramp further comprises, in the direction from the inner end to the outer end, a third portion adjacent to the second portion and having a non-horizontal third slope different from the second slope.

3. The data storage device of claim 2, wherein the third slope is steeper than the second slope.

4. The data storage device of claim 3, wherein the first portion and the second portion overlap with the disk media and the third portion is at least in part outside of the disk media in the distal direction.

5. The data storage device of claim 1, wherein:
each of the first slope and the second slope is curvilinear; and
the first slope has a smaller radius of curvature than the radius of curvature of the second slope.

6. A hard disk drive load/unload (LUL) ramp having an inner end configured for positioning in a hard disk drive proximal to a recording disk medium and an outer end configured for positioning in a hard disk drive distal from the recording disk medium, the LUL ramp comprising:
in a direction from the inner end to the outer end,
a first portion having a non-horizontal first slope; and
a second portion adjacent to the first portion and having a different non-horizontal second slope;
wherein the first slope is steeper than the second slope.

7. The LUL ramp of claim 6, further comprising:
in the direction from the inner end to the outer end, a third portion adjacent to the second portion and having a non-horizontal third slope different from the second slope.

8. The LUL ramp of claim 7, wherein the third slope is steeper than the second slope.

9. The LUL ramp of claim 6, wherein:
each of the first slope and the second slope is curvilinear; and
the first slope has a smaller radius of curvature than the radius of curvature of the second slope.

10. A hard disk drive comprising the LUL ramp of claim 6.

11. The LUL ramp of claim 8, wherein the first portion and the second portion are configured for overlapping with the recording disk medium and the third portion is configured for positioning at least in part outside of the recording disk medium in the distal direction.

12. A method for unloading a head stack assembly (HSA) from a recording-disk media stack, the method comprising:
actuating means rotating the HSA radially outward from a data area of the recording-disk media stack onto a load/unload (LUL) ramp, the LUL ramp comprising:
an inner end positioned over the recording-disk media stack and an outer end positioned outside of the recording-disk media stack; and
in a direction from the inner end to the outer end:
a first segment having a non-horizontal first slope, and
a second segment adjacent to the first segment and having a different non-horizontal second slope;
wherein the steepness of the first slope is greater than the steepness of the second slope.

13. The method of claim 12, wherein the LUL ramp further comprises:
in the direction from the inner end to the outer end, a third segment adjacent to the second segment and having a non-horizontal third slope different from the second slope.

14. The method of claim 13, wherein the steepness of the third slope is greater than the steepness of the second slope.

15. The method of claim 14, wherein the first segment and the second segment overlap with the recording-disk media stack and the third segment is at least in part outside of the recording-disk media stack in the distal direction.

16. The method of claim 12, wherein:
each of the first slope and the second slope is curvilinear; and
the first slope has a smaller radius of curvature than the radius of curvature of the second slope.

17. A data storage device comprising:
a disk media stack comprising a plurality of disk media rotatably mounted on a spindle;
a head stack assembly (HSA) comprising a plurality of head sliders each comprising a read/write head configured to read from and to write to at least one disk media of the disk media stack;
a voice coil motor configured to move the HSA for the plurality of head sliders to access portions of a corresponding disk media of the disk media stack; and
a load/unload ramp having an inner end positioned proximal to the disk media stack and an outer end positioned distal from the disk media stack, the load/unload ramp configured for loading the HSA to the disk media stack and for unloading the HSA from the disk media stack, the load/unload ramp comprising, in a direction from the inner end to the outer end:
a first portion having a non-horizontal first slope; and
a second portion adjacent to the first portion and having a different non-horizontal second slope;
wherein:
each of the first slope and the second slope is curvilinear, and
the first slope has a smaller radius of curvature than the radius of curvature of the second slope.

* * * * *